United States Patent [19]
Bratten

[11] Patent Number: 5,980,735
[45] Date of Patent: Nov. 9, 1999

[54] COLLECTION SYSTEM FOR MACHINE TOOL COOLANT

[76] Inventor: Jack R. Bratten, 5970 St. James Dr., West Bloomfield, Mich. 48322

[21] Appl. No.: 08/995,447

[22] Filed: Dec. 22, 1997

[51] Int. Cl.⁶ .......................... B01D 17/12; B01D 36/00
[52] U.S. Cl. ...................... 210/87; 137/551; 210/137; 210/167; 210/168; 406/85
[58] Field of Search ................ 210/87, 97, 101, 210/167, 168, 171, 137; 406/85, 111; 137/551, 56 R, 87.03

[56] References Cited

U.S. PATENT DOCUMENTS

| | | | |
|---|---|---|---|
| 2,595,559 | 5/1952 | Alvord | 210/167 |
| 4,264,240 | 4/1981 | Alexander | 406/85 |
| 4,655,940 | 4/1987 | Harms | 210/167 |
| 5,417,849 | 5/1995 | McEwen et al. | 210/168 |
| 5,466,380 | 11/1995 | Bratten | 210/168 |
| 5,662,812 | 9/1997 | McEwen | 210/167 |

*Primary Examiner*—Joseph W. Drodge
*Attorney, Agent, or Firm*—John R. Benefiel

[57] ABSTRACT

A collection system for collecting coolant and chips from a series of machine tools for cleaning the coolant in a filter system and recirculating the coolant back to the machine tools. The system includes a series of end-to-end connected shallow depth troughs disposed on the floor below the machine tools, defining a downward sloping gravity flow path. Flow nozzles are used to maintain sufficient flow velocity to move the collected debris and liquid to the end of the trough. Collector-deflector plates prevent oversplashing and misting out of the troughs. A flow nozzle control variably sets the diversion of clean coolant to the flow nozzles in accordance with the sensed velocity of the coolant in the trough.

14 Claims, 3 Drawing Sheets

COLLECTION SYSTEM FOR MACHINE TOOL COOLANT

BACKGROUND OF THE INVENTION

This invention concerns collection systems for receiving machine tool coolant collected to be filtered and recirculated to the tools. In production, machine tools are typically arranged in transfer lines. Coolant is directed at the cutting tools during machining to cool and lubricate the tools and flush chips and abrading grit away from the part. The coolant is allowed to drain into a floor trench, passing beneath the series of machine tools along with the chips and other solid debris from the machining operation. The liquid in the trench flows along an incline to carry the debris to a settling tank and filter systems, flow nozzles spaced along the trench aiding the flow of debris and insuring there is sufficient volume of liquid to move debris along the trench. The coolant is filtered and recirculated to the machine tools, while the chips are collected for disposal.

The velocity trenches have conventionally been installed below floor level to provide sufficient volume capacity for the accumulated coolant collected progressively from all of the machine tools arranged over and along the velocity trench. The below grade trenches also minimize the spillage of coolant on the floor around the machine tools.

This type of system increases the overall cost of a particular machine tool installation, but also renders it difficult to reconfigure. Also, it would sometimes be desirable to move the installation to another location in the plant or to another site completely. The existence of below grade trenching would make this costly or entirely unfeasible.

Overhead coolant collection piping systems have been devised to overcome this disadvantage, but these systems require large capacity piping and vacuum or pumping circulation systems, which are more complex than the gravity flow trench systems.

Another difficulty involves the flow nozzles which direct jets of clean coolant to the coolant flowing in the trench to insure that chips are carried along with the flow. Where there is an adequate volume of coolant draining from the machine tools, an excess volume of clean coolant is diverted to the flow nozzles than is necessary to keep the debris from accumulating in the trench.

Excessive velocity of the coolant also contributes to "misting" in which atomized liquid drifts out of the trenches and condenses on adjacent surfaces.

It is an object of the present invention to provide a machine tool coolant collection system which does not require below grade trenching and minimizes spillage of the coolant onto the adjacent floor surfaces, as well as misting.

It is another object of the present invention to provide such a collection system which uses flow nozzles supplied with an efficiently controlled diversion of clean coolant to the flow nozzles.

SUMMARY OF THE INVENTION

These and other objects of the present invention, which will become apparent upon a reading of the following specification and claims, are achieved by a collection system comprised of a series of connected formed trough sections resting on the floor on which a series of machine tools rest. The trough is of sufficiently shallow depth that the entire series is able to be fit beneath the series of machine tools bosses while maintaining the machine tools at a moderate height for ready access by operators. The trough sections are configured with shallowly, inclined bottoms, each supported so as to establish a gravity flow to collect coolant thereby induced to flow down the length of the connected trough sections.

Adequate flow velocity to move chips and other debris in the coolant is established primarily by jets of clean filtered coolant directed down the trough through a series of flow nozzles distributed along the length of the trough.

Just the proper volume of filtered liquid diverted to the flow nozzles is efficiently maintained by sensing the flow velocity in a downstream trough section, and operating a flow regulator valve in correspondence to the flow velocity. Thus, if the flow velocity decreases from the minimum level required, greater flow is diverted to the flow nozzles; and, as the flow velocity increases over the predetermined maximum level required, the flow to the flow nozzles is reduced.

Each section has an anti-splash cross sectional shape which includes laterally extending collector-deflector plates attached to each top edge of the trough section and tilted downwards towards a center gap between the plates. The plates extend well beyond and well inside the attached edge, such that a wide area is presented to collect the coolant from the machine and direct it into the trough interior. At the same time, the overhanging inner portions deflect backsplash back into the trough interior. An inwardly folded top edge of each collector-deflector plate also tends to defeat any liquid from washing out over the outside of the collector-deflector plates and onto the plant floor.

The flow nozzles are mounted within the trough sections underneath the overhang of the collector-deflector plates and behind a downturned inner edge to reduce misting and splashing.

The flow of coolant within the trough interior produces a slight vacuum at the gap between the plates drawings in an air current through the gap between the collector-deflector plates, further reducing the tendency for misting.

The trough sections are connected together with a flanged low profile sealed joint to minimize the overall trough height which must be fit into the clearance space beneath the machine tools.

If a greater length of trough is required than can be provided within the constraints imposed by the limits on the available space beneath the machines above floor level and the volume capacity required, back-to-back oppositely inclined sections can be employed with the outflow emptied into shallow sumps from which the collected liquid can be pumped to a central filtration system.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
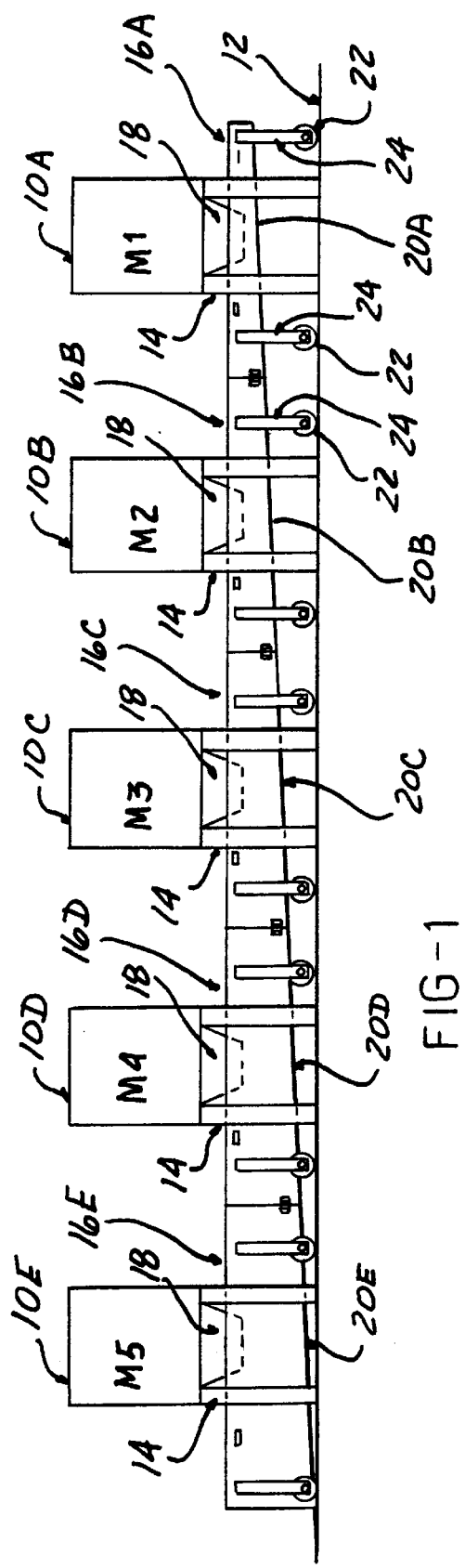
FIG. 1 is a diagrammatic elevational view of a series of machine tools and a coolant collection system therefor according to the invention.

Referring to the drawings and particularly FIG. 1, a series of machine tools 10A–10E is indicated diagrammatically, arranged along a line and supported by a floor surface 12. The machine tools 10A–10E are each supported above the floor 12 by bases 14.

A series of connected trough sections 16A–16E extend beneath the coolant collectors 18 of the machine tools 10A–10E so as to be positioned to collectively receive all of the machine tool coolant.

While a single trough section 16A–16E for each machine tool 10A–10E is shown, no such one-to-one relationship is necessary, the section lengths being as long as possible while still being able to be maintained into position with the available handling space.

Each of the trough sections 16A–16E have an inclined bottom wall defined by hemispherical shapes 20A–20E gradually increasing in diameter. The sections are supported at a varying height above the floor so as to create a downwardly pitched trough inducing gravity flow of the collected coolant down the length of the connected trough sections 16A–16E.

According to the concept of the present invention, a very shallow pitch is used, i.e. 1/16 of an inch per foot for example, to maximize the total run able to be realized from the available vertical space beneath the machine bases. Current design criteria require that the machine tools be located for easy access by operators without having to climb up ladders. Thus, clearances of 18–24 inches are typically the maximum available for an above grade trough. At the same time, the trough sections must be of sufficient size to accommodate the volume of collected coolant without excessive splashing and misting.

Flow nozzles are primarily relied on to maintain a sufficient flow velocity such that a low pitch can be used with adequately sized trough sections while still achieving the flow velocities required.

The trough sections 16A–16E are individually supported as by sets of wheels or rollers 22 supported on vertical bars 24 welded to the trough sides. Skids could also be used instead of wheels or rollers. The sections 16A–16E individually can thus be rolled or slid into position or removed from beneath the machine tools, as for installation or maintenance.

Each trough section 16A–16E may be generally hemispherical in cross section and have a bottom shallowly sloping in a downstream direction, as noted above.

Figure 4:
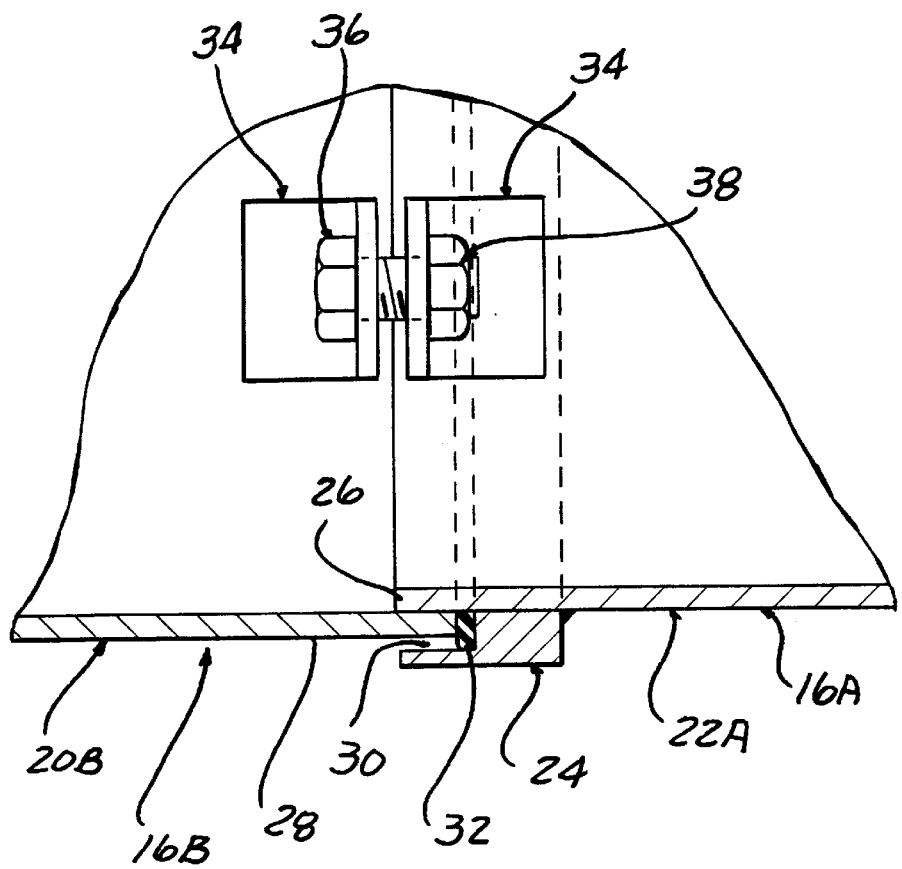
FIG. 4 is an enlarged fragmentary sectional view of a portion of the trough section joint between mating trough sections.

A low profile connection is shown in FIG. 4, which includes a half ring 24 welded to one end 26 of each trough section hemispherically-shaped section 16A–16E which are of progressively greater size. Thus, the upstream end 28 of the next section 16B is slidable over the downstream end 26 of the next ahead section 16, and within a groove 30 formed between the inside of the half ring 24 and the outside of the section end 26.

A seal 32 insures a watertight joint.

A series of right angle clips 34 are welded to each trough section end which receives bolts 36 and nuts 38 to hold the mating trough section ends together.

Figure 2:
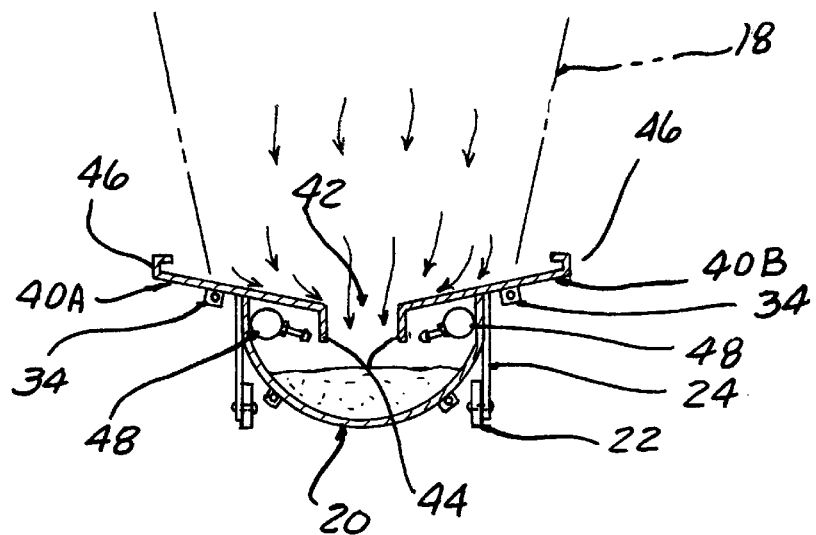
FIG. 2 is a cross sectional view of a trough section included in the collection system of FIG. 1.

Each trough section 16A–16E has left and right formed collector-deflector plates 40A–40B, each welded to one top edge of the hemispherical portion 20 (FIG. 2). The plates 40A–40B extend from well outboard of the hemispherical trough shapes 20A–20E to a point well within the space between the downwardly turned inner edges 44. The outer edges 46 are inwardly formed to minimize runover of the coolant collected from the machining tool discharge chute. A downward inclination of the plates 40A–40B funnels the liquid into the gap 42.

The flow nozzles 48 supplied by pipes 49 are disposed beneath the inboard portions of the collector-deflector plates 40A–40B to minimize splashing and misting. The jets issued from the nozzles 40 are primarily relied on to maintain the minimum flow velocity to achieve movement of the chips to the end of the trough system.

Figure 3:
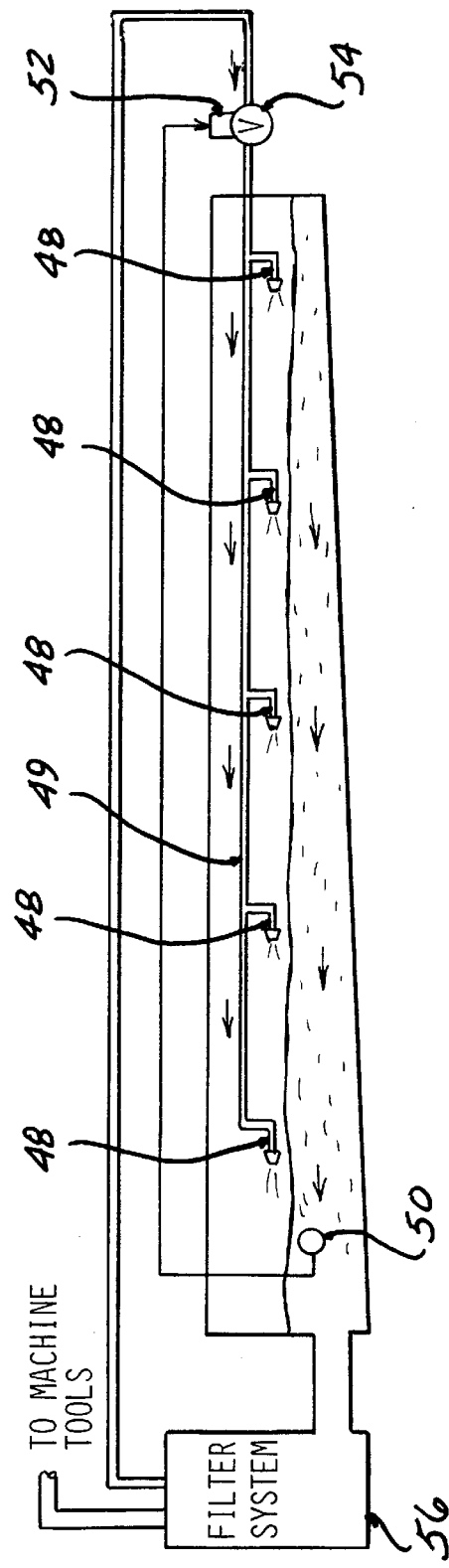
FIG. 3 is a diagrammatic view of the supply for the flow nozzles installed in the trough sections.

Referring to FIG. 3, the flow nozzles 48 are arranged at spaced intervals as required for the particular application. In order to efficiently utilize clean coolant in view of the relatively large volumes required by the shallowly pitched trough sections, a flow velocity sensor 50 is disposed within a downstream trough section and generates a signal transmitted to a valve controller 52 operating a regulator valve 54 correspondingly varying the flow of clean coolant diverted from a filter system 56 to the supply pipes 49.

A minimum coolant flow rate on the order of six to ten feet per second is typically required to transport the chips.

If the sensed velocity of the coolant declines below a predetermined minimum level, the pressure of the diverted clean coolant is increased to increase flow to the flow nozzles 48, increasing the flow velocity in the trough sections 16A–16E.

Conversely, if the sensed flow is significantly above that level, the pressure is decreased by the valve 54, decreasing the coolant flow. This decreases misting and conserves clean coolant.

Figure 5:
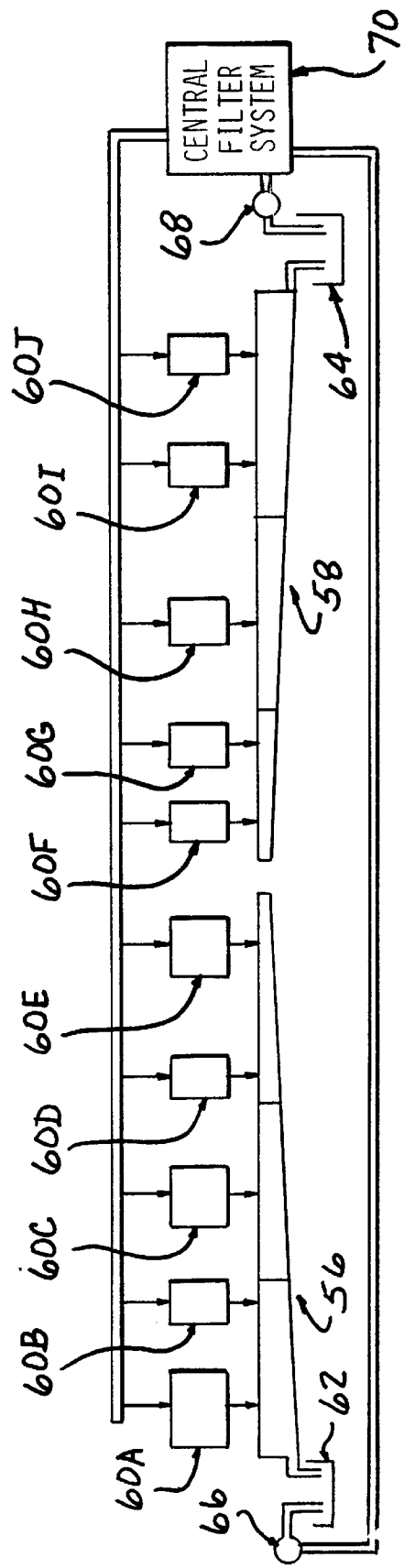
FIG. 5 is a diagrammatic elevational view of back-to-back sections used for a long length collection system.

Referring to FIG. 5, a back-to-back arrangement of two oppositely inclined troughs 56, 58 is shown. This arrangement increases the length of the series of machine tools 60A–60J which can be serviced by the low profile above grade troughs according to the invention.

In this case, shallow collection sumps 62, 64 can be installed at the respective away ends of the troughs 56, 58 to collect outflow of chips and liquid. Pumps 66, 68 pump the same to a central filter system 70, which supplies clean coolant back to the machine tools 60A–60J. The details concerning the flow nozzles, etc. are not shown, but would be included as in the above described embodiment.

I claim:

1. A collection system for collecting coolant from a series of machine tools arranged on a floor surface, said system comprising:

a series of formed trough sections located above said floor surface in a clearance space between said machine tools and said floor surface, said formed trough sections connected end-to-end and passing beneath said machine tools so as to collect coolant therefrom;

said formed trough sections each having a configuration such that in combination with the other sections they together establish a sloping trough bottom, said trough sections being of low height and said trough bottom being of a shallow slope so as to be accommodated within said clearance space, gravity thereby inducing flow of coolant down the length of said series of connected trough sections; and a series of flow nozzles distributed along the length of said series of trough sections directed down said trough sections, and means for supplying clean coolant under pressure to said flow nozzles to create jets of coolant directed down said trough sections, said flow nozzle jets and said slope of said trough bottoms creating a flow velocity sufficient to carry debris away;

whereby an above floor grade velocity trough is provided.

2. The system according to claim 1 wherein a collector-deflector plate is fixed atop a top edge of a side wall of each of said trough sections, and each collector-deflector plate extends partially across the open top of said trough sections to leave a gap with an opposite collector-deflector plate fixed to an opposite side edge.

3. The system according to claim 2 wherein each collector-deflector plate extends outwardly a substantial distance from the attached trough side wall, and is downwardly inclined towards the interior of the associated trough section to direct collected liquid thereinto.

4. The system according to claim 3 wherein an outer edge of each collector-deflector plate is formed back towards said trough section.

5. The system according to claim 4 wherein an inside edge of each collector-deflector plate is formed downwardly into the interior of said trough section.

6. The system according to claim 3 wherein said series of flow nozzles are mounted within said series of connected trough sections and are disposed beneath an overhang of a collector-deflector plate.

7. The system according to claim 1 wherein each of said trough sections has a hemispherically-shaped portion, sloping from one end to the other of said trough sections to create a downward slope when supported on said floor surface.

8. The system according to claim 7 wherein partial rings are fixed to one end of each trough section defining an annular slot receiving an end of a next adjacent trough section.

9. The system according to claim 1 wherein each trough section is supported on legs.

10. The system according to claim 1 wherein the slope of said trough sections is on the order of $\frac{1}{16}$ inch per foot and said clearance space is approximately 18 to 24 inches.

11. The system according to claim 1 further including a velocity sensor within said trough sections sensing the flow velocity of liquid in said trough sections, and means varying the volume of flow to said flow nozzles so as to maintain a predetermined minimum velocity level within said trough sections.

12. The system according to claim 1 wherein two series of oppositely sloping trough sections are arranged to connect back-to-back so as to each have a collection end opposite from the connection with the other series.

13. A machine tool coolant collection system including a trough extending beneath a series of machine tools to collect coolant and chips from each machine tool, said trough defining a downward incline to induce gravity flow of coolant down said trough;

a filter system receiving said coolant and cleaning the same, and recirculating clean coolant to said machine tools;

a series of flow nozzles distributed along the length of said trough directing a jet flow of clean coolant from said filter system into said trough for aiding movement of said coolant and chips down said trough;

a velocity sensor in said trough sensing the velocity of coolant flow in said trough; and regulator valve means varying the flow of clean coolant from said filter system to said flow nozzles to increase flow thereto whenever said coolant flow velocity declines below a predetermined level and to decrease flow whenever said coolant flow velocity increases above a predetermined level.

14. The system according to claim 13 wherein said predetermined flow velocity level is in the range of 6–10 feet per minute.

* * * * *